United States Patent Office 3,206,491
Patented Sept. 14, 1965

3,206,491
COMPOUNDS FOR COMBATTING PLANT-PARASITIC NEMATODES
Kurt Gubler and Enrico Knusli, Riehen, near Basel, Switzerland, assignors to J. R. Geigy, A.-G., Basel, Switzerland
No Drawing. Original application Aug. 17, 1962, Ser. No. 217,526, now Patent No. 3,119,735, dated Jan. 28, 1964. Divided and this application Jan. 29, 1963, Ser. No. 258,944
Claims priority, application Switzerland, Aug. 18, 1961, 9,672/61; Feb. 1, 1962, 1,232/62
9 Claims. (Cl. 260—455)

The present invention concerns new compounds for combatting plant-parasitic nematodes.

Up to now, only those compounds have become of practical importance for the combatting of nematodes which either act in the gaseous phase as is the case, for instance, with 1,2-dibromo-3-chloropropene and mixture of dichloropropane and dichloropropene, or which quickly decompose in the soil as is the case, for example, with the sodium salt of monomethyl dithiocarbamic acid, or 3,5-dimethyl-tetrahydro-1,3,5-thiadiazine-2-thione.

It has been found that compounds of Formula I

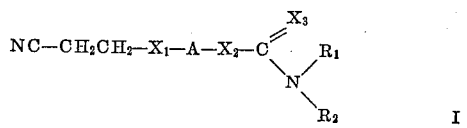

wherein $X_1$, $X_2$ and $X_3$ independently of each other represent oxygen or sulphur, $R_1$ and $R_2$ independently of each other represent hydrogen or an alkyl radical having from 1 to 4 carbon atoms, and A represents an alkylene radical with from 2 to 4 carbon atoms, at least two of which are bridging members between $X_1$ and $X_2$, are very suitable as active ingredients for combatting plant-parasitic nematodes.

Particularly effective are the compounds of Formula I supra in which $R_2$ is hydrogen and $X_1$, $X_2$, $X_3$ and $R_1$ have the above-given meaning.

Optimal results are obtained with those compounds of Formula I, in which $R_1$ is methyl and $R_2$ is hydrogen, $X_1$ in oxygen or sulfur, and $X_2$ and $X_3$ are both sulfur atoms (dithiocarbamic acid derivatives).

Because of their stability, the compounds of the formula given above have great advantages over the nematocides used and known up to the present. In contrast thereto, the above-mentioned sodium salt of monomethyl dithiocarbamic acid can only be stored as a solution of a narrowly defined concentration and only as such has it the stability necessary for a successful application. This means, for example, that the very desirable application as sprinkling agent is excluded. The compounds of Formula I, however, either alone or mixed with suitable carriers in the form of nematocidal compositions, can also be used with excellent results in other form, for instance as sprinkling or dusting agents.

In addition, the toxicity, irritant action and unpleasant smell of the compounds produced according to the invention is considerably less than with the nematocides used up to now.

The compounds of Formula I are obtained according to the invention by reacting a compound of Formula II:

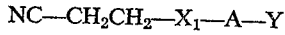

with a compound of Formula III:

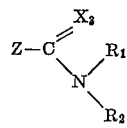

in which $X_1$, $X_3$, $R_1$, $R_2$ and A have the meanings given above, and of the radicals Y and Z, one represents a mobile radical which can be split off as anion and the other represents the group —$X_2Q$, wherein Q represents a mobile radical which can be split off as cation during the reaction. The radical which is split off as anion is preferably a halogen atom such as e.g. chlorine or bromine. The radical Q which is split off as cation during the reaction is either hydrogen or a metal atom, preferably an alkali metal atom, or the ammonium group or the equivalent of an earth alkali metal atom. In the reaction, the splitting off of the halogen anion as hydrogen halide or as alkali metal- or alkaline earth metal- or ammoniumhalide takes place with simultaneous formation of an oxygen- or sulphur bridge between the radicals of the compounds II and III.

The reaction can be performed in the presence of an organic and inorganic base as well as, optionally, in the presence of a solvent. Examples of organic bases are aliphatic and heterocyclic tertiary amines such as triethylamine, pyridine etc. Alkali metal hydroxides such as sodium hydroxide and potassium hydroxide can be used, for example, as inorganic bases. Water, aromatic hydrocarbons such as, e.g. benzene, toluene or xylenes, and also esters are used as solvent.

According to a variation of this process instead of reactive functional derivatives of acids of Formula III, phosgene or thiophosgene and the corresponding alkylamines or the corresponding alkyl isocyanates or alkyl isothiocyanates are reacted with compounds of the general Formula II, wherein Y represents a hydroxyl or mercapto group.

According to another process for the production of compounds of Formula I, a compound of Formula IV

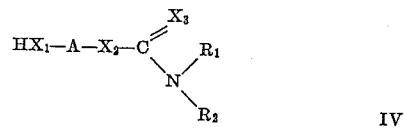

wherein $X_1$, $X_2$, $X_3$, A, $R_1$ and $R_2$ have the meanings given above, is reacted with acrylonitrile. This reaction may be performed in the presence of a base and/or of a solvent. Tertiary aliphatic or heterocyclic amines such as triethylamine, or pyridine, or alkali hydroxides are used as bases and water, aromatic hydrocarbons, aliphatic ketones and liquid fatty acid alkyl esters are employed as solvents.

For the combatting of nematodes, the new compounds are applied in solid form, for example as finely pulverised sprinkling agent, or as a granulate; it can also be applied in liquid form as emulsion, suspension or solution. The choice of application form depends on the intended use which, in its turn, depends in particular on the type of nematodes to be combatted, the plant cultivation to be protected, the climate and soil conditions as well as on the technical working conditions. As even a distribution of the active ingredient as possible over a layer of soil of about 15–25 cm. depth is generally of advantage, the amount of active ingredient necessary being, in general, 50 to 250 kg./hectare. It is also possible, however, to make a limited application directed to dibber holes or seed furrows which, in some circumstances, give a sufficient protective action with a reduced amount of active ingredient.

Dusts can be produced on the one hand, by mixing or milling together the active substance with a solid, pulverulent carrier which is insoluble in or difficultly soluble in water. As such can be used, e.g.; talcum, diatomaceous earth (kieselguhr), kaolines, bentonites, calcium carbonate, boric acid or tricalcium phosphate. On the other hand, the active substance can also be drawn onto the carrier by means of a volatile solvent. For the production of sprinkling agents, either more coarsely grained and/or specifically heavier carriers such as e.g. more coarsely ground limestone, sand and loess can be used, or also mixtures of the active substance can be granulated with more finely grained, possibly porous, carriers.

In addition, sprinkling agents can contain as carriers in coarsely grained, possibly granulated form, solid substances of greater solubility in water or citrate, e.g. synthetic fertilisers such as solubilised calcium phosphate or other calcium, potassium or ammonium salts, loess, phosphates or nitrates.

For instance, suitable compositions in granulate form are obtained when 5 to 10 parts by weight of active substance are mixed with 90 to 95 parts of a pulverulent inert carrier, e.g. sand or calcium carbonate, and the mixture is moistened with 1 to 5 parts by weight of water or isopropanol. The mixture is then granulated.

Before granulating the above mixture, a multiple amount, e.g. 100 to 900 parts of a synthetic fertiliser which may be water soluble such as e.g. ammonium sulphate, can be mixed in.

Emulsions according to the invention can be used both on unplanted ground and, because of their penetration power, in existing plant cultivations. They are produced, for example, by dissolving the compound according to the invention in organic solvents such as e.g. xylene, and emulsifying this solution in water which contains a surface active substance. For the application of emulsions it is generally advantageous in practice to produce concentrates by combining the active substance with inert organic solvents and/or surface active substances (emulsifying agents), which concentrates in their turn are mono- or poly-phase systems and can be worked up with water into ready-for-use emulsions. As surface active agents (emulsifying agents) both cation active substances such as e.g. quaternary ammonium salts, anion active substances such as salts of aliphatic, long chained sulphuric acid monoesters, long chained alkoxy acetic acids and aliphatic-aromatic sulphonic acids, and non-ionogenic surface active substances, e.g. polyethylene glycol ethers of fatty alcohols or of dialkylphenols and polycondensation products of ethylene oxide can be used as well as amphoteric surface active substances. Suitable solvents for the production of emulsion concentrates are e.g. cyclic hydrocarbons such as benzene, toluene, xylene, ketones, alcohols and other solvents such as e.g. ethyl acetate, dioxan, acetone, glycerine or diacetone alcohol.

Suspensions can be obtained by direct suspension of the moist active ingredients in water which possibly contains a surface active substance, or by suspending wettable powders. These are produced by mixing solid active ingredients with surface active substances or with solid pulverulent carriers and surface active substances.

As solvents for the active substances according to the invention, in particular halogen hydrocarbons having themselves a nematocidal action are used, e.g. 1,2-dibromo-3-chloropropene, dichlorbutene or mixtures of dichloropropane and dichloropropene the instantaneous action of which is broadened in a valuable way by the long lasting action of the active substances according to the invention.

The active substances according to the invention can be used for combatting the most various types of nematodes such as e.g. *Meloidogyne arenaria,* Pratylenchus sp., *Ditylenchus dipsaci* etc.

In the amounts necessary in practice, these new substances have no phytotoxic action so that injurious effects on plant growth are excluded. If desired, the biological activity of the agents according to the invention can be broadened by the addition of fungicidal, herbicidal or insecticidal or other nematocidal active ingredients.

The production of the new compounds according to the invention is further described in the following examples. Parts are given as parts by weight and the temperatures are in degrees centigrade, unless stated otherwise.

PREPARATION OF

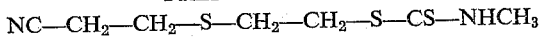

Example 1

15 parts of β-(β-cyanoethylmercapto)-ethyl chloride are added dropwise to a solution of 165 parts of the sodium salt of monomethyl dithiocarbamic acid in 100 parts by volume of water at room temperature and the whole is stirred for 7 hours at 30–60°. On cooling, the organic phase crystallises. β - (β - cyanoethylmercapto)-ethyl-N-methyl dithiocarbamate is obtained by recrystallisation from a mixture of methanol/water; M.P. 69.5–72.5°.

Example 2

12.9 parts of the sodium salt of monomethyl dithiocarbamic acid and 9.65 parts of β-chloroethyl mercaptan are stirred for 4 hours in benzene at 50–60°. The sodium chloride which precipitates is filtered off, 5.3 parts of acrylonitrile are added to the filtrate and, in the presence of a catalytic amount of pyridine, the whole is heated for 1 hour at 50–60°. The product is worked up as described in Example 1. The resulting β-(β-cyanoethylmercapto)-ethyl N-methyl dithiocarbamate is the same compound as has been obtained in the preceeding example, its melting point being 69.5–72.5°.

PREPARATION OF

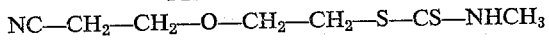

Example 3

26.7 parts of β-(β-cyanoethyloxy)-ethyl chloride are added dropwise at room temperature to a solution of 39 parts of the sodium salt of monomethyl dithiocarbamic acid in 160 parts of water and the whole is stirred for 7 hours at 30 to 60°. The organic phase is taken up in ether, washed twice with 200 parts of water, the ethereal solution is dried with sodium sulphate and the solution is concentrated. Unreacted β - (β - cyanoethyloxy)-ethyl chloride is distilled off in vacuo whereupon β-(β-cyanoethyloxy)-ethyl-N-methyl-dithiocarbamate of good purity remains.

In an analogous manner, β-(β-cyanoethyloxy)-ethyl-N-dimethyl-dithiocarbamate is obtained. It distills at 188°/1.3 mm.

Example 4

16 parts of the sodium salt of monomethyl dithiocarbamic acid and 8.0 parts of β-chloroethyl alcohol are stirred for 10 hours in benzene at 50–60°. The sodium chloride which precipitates is filtered off by suction, 5.3 parts of acrylonitrile are added to the filtrate and the whole is heated for 1 hour at 70–80° in the presence of a catalytic amount of pyridine. The same substance as in Example 3, namely, β-(β-cyano-ethyloxy)-ethyl-N-methyl-dithiocarbamate is obtained.

PREPARATION OF

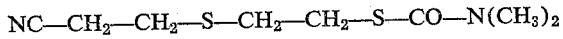

Example 5

(a) 18.8 parts of dithioethanol are heated with 10.7 parts of dimethyl-carbamyl chloride at 90° to 100° for 5 hours. Nitrogen is slowly passed through the reaction mixture in order to remove the nascent hydrogen chloride gas. The reaction product is then taken up in ether and the ethereal solution is extracted with 3 times 100 parts by volume of ice-cold aqueous 2-normal sodium hydroxide solution. The alkaline aqueous solution is at once adjusted with 2-normal hydrochloric acid to give an acid reaction with Congo paper, it is then extratced with ether and washed with water to neutral.

In order to purify the product, the ether residue is distilled yielding N-dimethylcarbamylthioethyl mercaptan, its $B.P._{11}$ being 126–131°.

(b) 13 parts of the latter product ars mixed with 5.3 parts of acrylonitrile, and 1 part of piperidine is then added to the mixture dropwise and with good cooling. The ensuing reaction is strongly exothermic. The mixture is then stirred for 2 hours at room temperature. For the purpose of purification, the resulting β-(β-cyanoethylmercapto)-ethyl-N,N-dimethyl-thiol-carbamate is distilled; its boiling point is: $B.P._{0.3}$=167.5°–168.5°.

PREPARATION OF NC—CH$_2$—CH$_2$—O—CH$_2$—CH$_2$—CH$_2$—S—CS—N(CH$_3$)$_2$

Example 6

14.7 parts of β-cyanoethoxy-γ-propyl chloride are dissolved in 150 parts by volume of acetone and an aqueous solution of 28.6 parts of the sodium salt of dimethyldithiocarbamic acid in 150 parts of water is added thereto. The resulting solution is stirred for 15 hours at 50–60°. Acetone is then distilled off, the residue is taken up in ether, and the ethereal solution is washed twice with water. The residue resulting by evaporation of the ether in vacuo is then purified by distillation, and γ-(β-cyanoethyloxy)-propyl-N,N-dimethyl dithiocarbamate of $B.P._{0.03}$=156° is obtained.

In an analogous manner, γ-(β-cyanoethyloxy)-butyl-N,N-dimethyl dithiocarbamate is obtained by using the corresponding starting chloride.

PREPARATION OF NC—CH$_2$—CH$_2$—O—CH$_2$—CH$_2$—CH$_2$—S—CS—NHCH$_3$

Example 7

14.75 parts of β-cyanoethyloxy-γ-propyl chloride are added dropwise, at room temperature, to a 28%-aqueous-alcoholic solution of the ammonium salt of N-methyl-dithiocarbamic acid. The mixture is then stirred for two days at room temperature. It is then worked up with an excess of water and extracted with ether. After distilling off the latter, a residue consisting of γ-(β-cyano-ethyloxy)-propyl-N-methyl dithiocarbamate of good purity remains.

In the same manner, δ-(β-cyanoethyloxy)-butyl-N-methyl dithiocarbamate and β-(β-cyanoethyloxy)-propyl-N-methyl dithiocarbamate, the latter of the formula

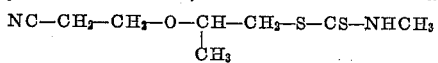

are obtained by using the corresponding starting chlorides.

Example 8

PREPARATION OF
NC—CH$_2$—CH$_2$—S—CH$_2$—CH$_2$—O—CO—N(CH$_3$)$_2$ 39.3 parts of β-(β-cyanoethylthio)-ethanol are emulsified in 400 parts by volume of benzene and 82.8 parts of dried potassium carbonate and 7.2 parts of potassium iodide are added thereto, 35 parts of dimethyl carbamyl chloride are then added and the resulting mixture is boiled at the reflux for about 12 hours. In order to recover the reaction product, the insoluble residue is filtered off by suction and the filtrate is washed three times with an excess of water. After distilling off benzene, the liquid residue is purified by distillation. Pure β-(β-cyano-ethylthio)-ethyl-N,N-dimethyl-carbamate is obtained, $B.P._{0.001}$=115–118°

In the following examples, test methods used to determine the activity of the new nematocidally active compounds, and also some typical forms of nematocidal compositions containing these compounds are described together with results obtained when combatting plant-parasitic nematodes therewith. Parts are given by weight.

Example 9

Two test mixtures are prepared, each by mixing thoroughly an amount of β-(β-cyanoethyl)-mercapto)-ethyl-N-methyl-dithiocarbamate necessary to obtain a concentration of 50 p.p.m. and 100 p.p.m. thereof, respectively, in the final mixture, with 20 millilitres of washed and dried sand, and mixing the resulting mixture with 1 litre of natural soil which has been infested with Meloidogyne arenaria. After a period of 7 days, the soil is put into three pots and two tomato seedlings are set in each. After 9 weeks, the tumours formed in the roots of the plants are counted and the weight of the plants is determined. Counting of the tumours shows that with 50 p.p.m. a more than 90% action is attained, with 100 p.p.m. a substantially complete action is attained. The substance has no phytotoxic properties.

Example 10

20 parts of the compound of the formula

NC—CH$_2$—CH$_2$—S—CH$_2$—CH$_2$—S—CS—NH—CH$_3$ (Examples 1 or 2) and 80 parts of talcum are milled to the greatest degree of fineness in a ball mill. The mixture obtained serves as a dust against nematode infestations.

Example 11

20 parts of the compound of the formula

NC—CH$_2$—CH$_2$—O—CH$_2$—CH$_2$—S—CS—NHCH$_3$ (Example 3 or 4) are dissolved in a mixture of 48 parts of diacetone alcohol, 16 parts of xylene and 16 parts of an anhydrous high molecular condensation product of 40 to 80 moles of ethylene oxide with one mole of higher fatty acid having from 12 to 18 carbon atoms. This concentrate can be diluted with water to form emulsions of any concentration desired.

Example 12

80 parts of the compound of the formula

NC—CH$_2$—CH$_2$—O—CH$_2$—CH$_2$—CH$_2$—S—CS—NHCH$_3$ (Example 7) are mixed with 2 to 4 parts of a wetting agent, e.g. sodium salt of an alkyl polyglycol ether monosulphate, 1 to 3 parts of a protective colloid, e.g. sulphite waste liquor, and 15 parts of an inert solid carrier such as, e.g. kaolin, bentonite, chalk or kieselguhr, and the mixture is then milled finely in a suitable mill. The wettable powder so obtained can be stirred with water and produces very stable suspensions.

Example 13

5 parts by weight of the compound of the formula

NC—CH$_2$—CH$_2$—S—CH$_2$—CH$_2$—S—CO—N(CH$_3$)$_2$ (Example 5) are mixed and milled with 95 parts by weight of calcium carbonate (=ground limestone). The product is used as a nematocidal sprinkling agent.

Example 14

5 parts by weight of the compound of the formula

NC—CH$_2$—CH$_2$—O—CH$_2$—CH$_2$—CH$_2$—S—CS—NHCH$_3$ (Example 7) are mixed with 95 parts of a pulverulent carrier, e.g. sand or calcium carbonate, and the mixture is moistened with 1 to 5 parts by weight of water or isopropanol. The mixture is then granulated.

Before granulating, a multiple amount, e.g. 100–900 parts of a possibly water-soluble synthetic fertiliser such as e.g. ammonium sulphate, can be mixed into the above mixture or into one containing more active substance, e.g. one of 10 parts of active substance and 90 parts of calcium carbonate.

Example 15

A nematocidal solution which is emulsifiable in water is obtained by mixing 50 parts of the compounds of the formula

NC—CH$_2$—CH$_2$—O—CH$_2$—CH$_2$
—CH$_2$—S—CS—NHCH$_3$ (Example 7), 45 parts of xylene, 2.5 parts of an ethylene oxide condensation product of ethylphenol and 2.5 parts of a mixture of the sodium salts of dodecyloxyethyl sulphuric acid and dodecylethoxyethoxyethoxy sulphuric acid.

Example 16

In a field test, β-(β-cyanoethylthio)-ethyl-N-methyl dithiocarbamate (produced as described in Example 1) is applied as a sprinkling agent in the form prepared as described in Example 13, and its nematocidal activity against Meloidogyne sp., Pratylenchus sp. and other plant-parasitic nematodes is evaluated. Tomatoes, bushy beans and melons are used as test plants. The activity of the agent is determined by an analysis of the soil which is carried out about 4 weeks after the treatment, and by weighing the harvested fruit from a treated and from an untreated control field.

The results of soil analysis have been compiled in the table below, and are expressed as the rate of killed to initially present nemotodes (in percent). A sample of 20 cc. of soil taken from a soil test amount of 500 cc. was analysed.

|  | Concentration of active compound in g./m.$^2$ surface, sprinkled on and worked in to a depth of 20 cm. | | |
| --- | --- | --- | --- |
|  | 10 | 20 | 40 |
| Meloidogyne sp. | 85 | 100 | 100 |
| Pratylenchus sp. | 97 | 100 | 100 |
| Other plant-parasitic nematodes | 99 | 100 | 97 |

The yield of tomatoes, beans and melons was 60 to 100% above that obtained from an untreated control field of equal size and equal number of plants.

The present application is a division of copending application Serial No. 217,526, filed August 17, 1962, now U.S. Patent 3,119,735.

What is claimed is:

1. A compound of the formula

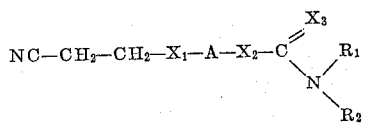

wherein
one of X$_1$, X$_2$ and X$_3$ is sulphur and each of the others of X$_1$, X$_2$ and X$_3$ is a member selected from the group consisting of oxygen and sulphur,
each of R$_1$ and R$_2$, independently of each other, is a member selected from the group consisting of hydrogen and alkyl of maximally 4 carbon atoms, and
A is an alkylene radical with from 2 to 4 carbon atoms, at least two of which are bridging members between X$_1$ and X$_2$.

2. The compound of the formula

NC—CH$_2$—CH$_2$—S—CH$_2$—CH$_2$—S—CS—NHCH$_3$

3. The compound of the formula

NC—CH$_2$—CH$_2$—O—CH$_2$—CH$_2$—S—CS—NHCH$_3$

4. The compound of the formula

NC—CH$_2$—CH$_2$—S—CH$_2$—CH$_2$—S—CO—N(CH$_3$)$_2$

5. The compound of the formula

NC—CH$_2$—CH$_2$—O—CH$_2$
—CH$_2$—CH$_2$—S—CS—N(CH$_3$)$_2$

6. The compound of the formula

NC—CH$_2$—CH$_2$—O—CH$_2$—CH$_2$
—CH$_2$—S—CS—NHCH$_3$

7. The compound of the formula

NC—CH$_2$—CH$_2$—O—(CH$_2$)$_4$—S—CS—NHCH$_3$

8. The compound of the formula

NC—CH$_2$—CH$_2$—O—CH—CH$_2$—S—CS—NHCH$_3$
            |
            CH$_3$

9. The compound of the formula

NC—CH$_2$—CH$_2$—S—CH$_2$—CH$_2$—O—CO—N(CH$_3$)$_2$

References Cited by the Examiner

Delaby et al.: Bull. Soc. Chim. (France) 1959, 190–194.

CHARLES B. PARKER, *Primary Examiner.*

DANIEL D. HORWITZ, *Examiner.*